United States Patent
Seo

(10) Patent No.: US 6,694,156 B2
(45) Date of Patent: Feb. 17, 2004

(54) APPARATUS AND METHOD FOR DISPLAYING AVAILABLE SERVICE TIME IN MOBILE TELEPHONES

(75) Inventor: One-Hyoung Seo, Suwon-shi (KR)

(73) Assignee: Samsung Electronics Co., Ltd. (KR)

( * ) Notice: Subject to any disclaimer, the term of this patent is extended or adjusted under 35 U.S.C. 154(b) by 544 days.

(21) Appl. No.: 09/771,040

(22) Filed: Jan. 26, 2001

(65) Prior Publication Data

US 2001/0009864 A1 Jul. 26, 2001

(30) Foreign Application Priority Data

Jan. 26, 2000 (KR) .......................................... 2000-3626

(51) Int. Cl.$^7$ ................................................ H04B 1/38
(52) U.S. Cl. ..................... 455/574; 455/343.5; 455/566
(58) Field of Search ................................. 455/572, 573, 455/574, 343.1, 343.5, 226.1, 566; 340/7.32

(56) References Cited

U.S. PATENT DOCUMENTS

| | | | | |
|---|---|---|---|---|
| 5,333,176 A | * | 7/1994 | Burke et al. ................ | 455/557 |
| 6,408,020 B1 | * | 6/2002 | Kaji et al. .................. | 375/216 |
| 6,463,305 B1 | * | 10/2002 | Crane ........................ | 455/566 |
| 6,522,900 B1 | * | 2/2003 | Cho ........................... | 455/572 |

* cited by examiner

*Primary Examiner*—Nguyen T. Vo
*Assistant Examiner*—Nhan T Le
(74) *Attorney, Agent, or Firm*—Dilworth & Barrese, LLP

(57) ABSTRACT

Disclosed is a method of displaying available service time in a mobile telephone including the steps of (a) determining whether or not a presently measured charging level value X of a battery is greater than a power-down threshold level value when the mobile telephone is powered on; (b) displaying an icon corresponding to the presently measured charging level value X of the battery, the icon indicative of a plurality of degrees, if it is determined whether or not the currently measured charging level value X of the battery is greater than the power-down threshold level value; (c) updating a available service time value Y per a unit level and storing it in a available service time-per-unit level memory when the completion of speaking by telephone is sensed if the mobile telephone is being used; and (d) reading the available service time value Y per the unit level from the available service time-per-unit level memory, and then calculating a available service time Z by using the read available service time value Y per the unit level when the selection of a available service time menu is sensed if the mobile telephone is in an idle state after the step (b) has been performed.

6 Claims, 3 Drawing Sheets

APPARATUS AND METHOD FOR DISPLAYING AVAILABLE SERVICE TIME IN MOBILE TELEPHONES

BACKGROUND OF THE INVENTION

1. Field of the Invention

The present invention relates to an apparatus and method for displaying available service time in mobile telephones, and more particularly to a method of displaying available service time in mobile telephones in terms of a numerical value.

2. Description of the Related Art

In general, mobile telephones or mobile terminals display the charging state of a battery by using an icon, represented in three or four degrees to inform users of the present charging state of the battery. As a standby time of the battery and available service time of the mobile telephones are extended along with development of related technologies, a fully charged battery now enables users to carry the mobile telephones for a few days without the need for recharging. For this reason, users are able to use the mobile telephones even when the power level is low, as shown by an icon on the display being at a first degree or so. However, after users have identified the power level or charging state as being at the first degree or so and have gone out without recharging the battery, they often are made aware of trouble due to an alarm signal indicative of the exhaustion of the battery, which may be followed by a sudden power-off of the mobile terminals (telephones) while in the middle of a call. Although there is some difference between mobile terminals, most mobile terminals can provide a continuous call service for only about 5 minutes or so after the generation of the alarm signal indicative of the exhaustion the battery.

FIG. 1 is a control flowchart illustrating the process for displaying a available service time in mobile telephones according to the prior art.

Referring to FIG. 1, at step 110, when a mobile terminal is powered on, the program proceeds to step 120 in which a controller checks whether or not a currently measured charging level value X of the battery is greater than a power-down threshold value A. If it is determined at step 120 that the currently measured charging level value of the battery X is not greater than the power-down threshold value A, the program proceeds to step 140 where the mobile telephone is powered off. On the other hand, if it is determined at step 120 where the currently measured charging level value X of the battery is greater than the power-down threshold value A, the program proceeds to step 130 where a display section displays an icon according to a degree (B, C, D, or F) corresponding to the currently measured charging level value X of the battery.

The degrees represent battery-charging levels predetermined numerically according to the type and capacity of the battery. The degree B indicates the third degree (fully charged) level, the degree C indicates the second degree level, the degree D indicates the first degree level, and the degree F indicates a low battery-charging level.

After such an icon has been displayed at step 130, the mobile terminal goes in an idle state.

However, the accuracy of the displayed icon for mobile telephones having batteries with large capacities, such as standby times of six nights and seven days, or as many as sixteen nights and seventeen days, is not well represented by using an icon having only three or four degrees. That is, it is necessary that user be informed of information on how long he is able to use the mobile terminal under the current charging state of the battery, i.e., a concrete and correct indication of serviceable time of the mobile terminal.

SUMMARY OF THE INVENTION

Therefore, an object of the present invention is to provide a device for and a method of displaying available service time in mobile telephones in which users can be informed about the charging state of a battery, presented as information expressed numerically and adaptive for variations in performance of the battery according to its use.

In order to achieve the above object, according to one aspect of the present invention, there is provided a device for displaying available service time in a mobile telephone, comprising:

a battery voltage detecting section adapted to measure a current charging level value of a battery when the mobile telephone is powered on;

an analog/digital converter adapted to convert the measured analog current charging level value into a digital value;

a reference data memory adapted to store a predetermined power-down threshold level value depending on the type of each battery;

an available service time-per-unit level memory adapted to store a available service time value per a unit level measured and updated, except an initial default value, any time a user attempts to use the telephone;

an available service time calculating section adapted to calculate a available service time by using both the power-down threshold level value according to a corresponding battery type and the available service time value per the unit level read out from the available service time-per-unit level memory;

an available service time memory adapted to store the calculated available service time therein; and a display section adapted to display the calculated available service time stored in the available service time memory to inform the user of the current charging state of the battery.

According to another aspect of the present invention, there is provided a method of displaying available service time in a mobile telephone, comprising:

(a) determining whether or not a currently measured charging level value X of a battery is greater than a power-down threshold level value when the mobile telephone is powered on;

(b) displaying an icon corresponding to the currently measured charging level value X of the battery, the icon having a plurality of degrees, if it is determined that the currently measured charging level value X of the battery is greater than the power-down threshold level value;

(c) updating an available service time value Y per a unit level and storing it in a available service time-per-unit level memory upon sensing completion of a call if the mobile telephone is being used; and (d) reading the available service time value Y per the unit level from the available service time-per-unit level memory, and then calculating a available service time by using the read available service time value Y per the unit level when the selection of a available service time menu is sensed if the mobile telephone is in an idle state after the step (b) has been performed.

BRIEF DESCRIPTION OF THE DRAWINGS

The foregoing and other objects, features and advantages of the present invention will become more apparent from the following detailed description when taken in conjunction with the accompanying drawings in which.

DETAILED DESCRIPTION OF THE PREFERRED EMBODIMENT

Figure 1:
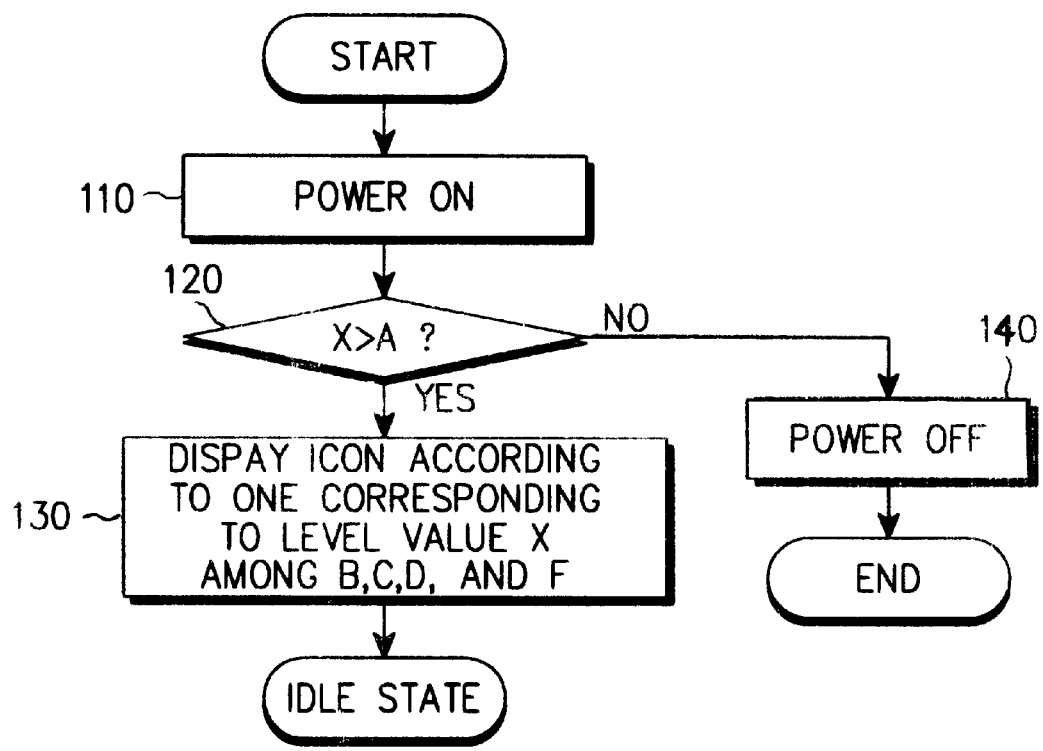
FIG. 1 is a control flowchart illustrating the process for displaying a available service time in mobile telephones according to the prior art.

Reference will now be made in greater detail to the preferred embodiments of the present invention. In the drawings, the same or similar elements are denoted by the same reference numerals even though they are depicted in different drawings. In the following description of the present invention, numerous specific details, such as specific numerical values representing charging levels of a battery, are set forth to provide a more thorough understanding of the present invention. It will be apparent, however, to those skilled in the art that the invention may be practiced otherwise than according to the previously mentioned specific details. The detailed description of known functions and configurations incorporated herein have been omitted when it may have made the subject matter of the present invention unclear.

Figure 2:
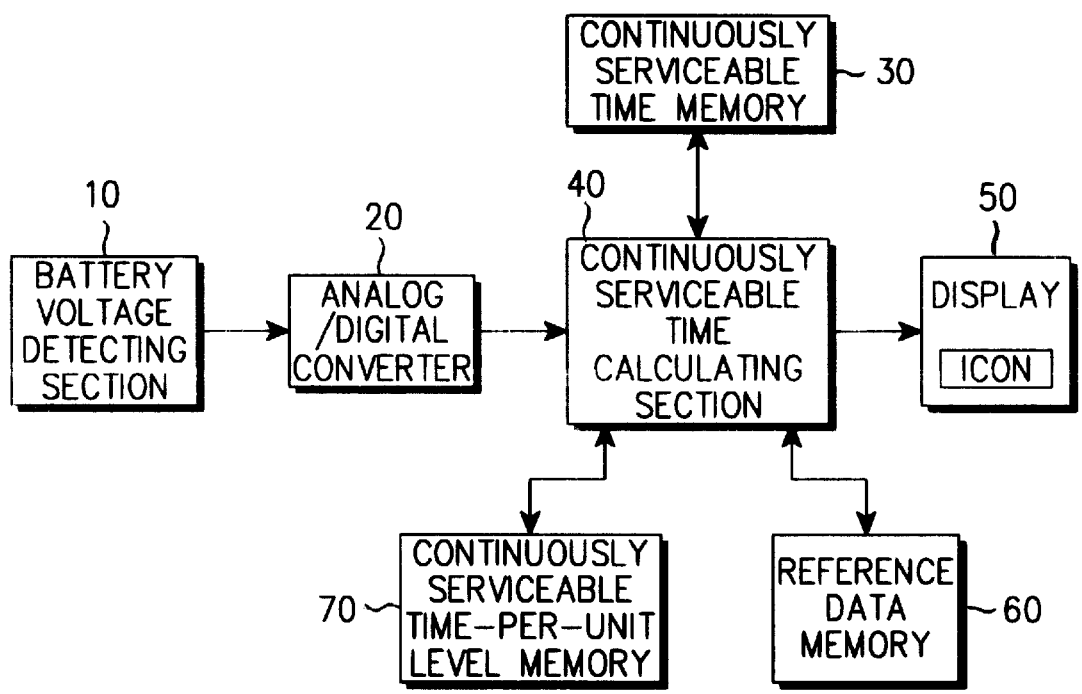
FIG. 2 is a block diagram illustrating the construction of a device for displaying available service time in mobile telephones according to a preferred embodiment of the present invention.

FIG. 2 is a block diagram illustrating the construction of a device for displaying available service time in mobile telephones according to a preferred embodiment of the present invention.

Referring to FIG. 2, a device for displaying available service time in a mobile telephone according to the present invention includes a battery voltage detecting section 10, an analog/digital converter 20, a reference data memory 60, a available service time-per-unit level memory 70, a available service time calculating section 40, a available service time memory 30 and a display section 50. The battery voltage detecting section 10 measures a present charging level value of a battery when the mobile telephone is powered on. The analog/digital converter 20 converts the analog present charging level value measured by the battery voltage detecting section 10 into a digital value. The reference data memory 60 stores a predetermined power-down threshold level value depending on the type of battery used. The available service time-per-unit level memory 70 stores a available service time value per a unit level measured and updated, except an initial default value, any time a user attempts to use the telephone. The available service time calculating section 40 calculates a available service time by using both the power-down threshold level value according to a corresponding battery type and the available service time value per the unit level read out from the available service time-per-unit level memory 70.

The available service time value per the unit level applied to the above stated calculation process has a default value when mobile telephones are put on the market. The default value is measured and updated any time a user attempts to use the telephone after the user has purchased a mobile telephone, and then is stored in a non-volatile memory. In this manner, application of a variable data value minimizes error values in calculation that can be generated depending on the difference in the type of a battery and a variation in performance. The available service time memory 30 stores the available service time calculated by the available service time calculating section 40 therein. The display section 50 displays the calculated available service time stored in the available service time memory 30 in the form of an icon to inform the user of the present charging state of the battery.

Figure 3:
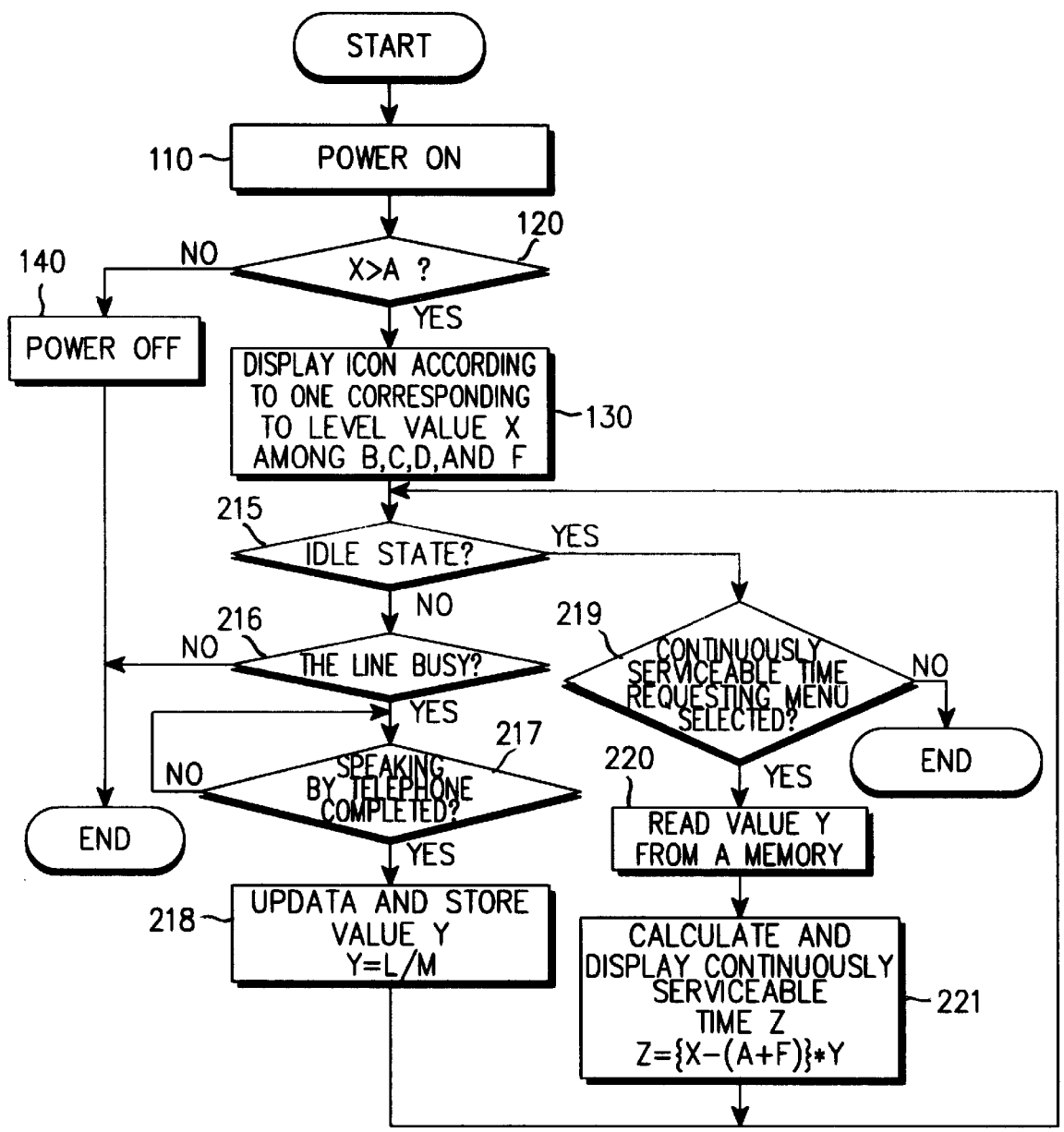
FIG. 3 is a control flowchart illustrating the process for displaying a available service time in mobile telephones according to a preferred embodiment of the present invention.

FIG. 3 is a control flowchart illustrating the process for displaying a available service time in mobile telephones according to a preferred embodiment of the present invention.

Referring to FIG. 3, at step 110, when a mobile terminal is powered on, the program proceeds to step 120 in which a controller checks whether or not a presently measured charging level value X of the battery is greater than a power-down threshold value A. If it is determined at step 120 that the presently measured charging level value of the battery X is not greater than the power-down threshold value A, the program proceeds to step 140 where the mobile telephone is powered off. On the other hand, if it is determined at step 120 that the currently measured charging level value X of the battery is greater than the power-down threshold value A, the program proceeds to step 130 where a display section 50 displays an icon according to a degree (B, C, D, or F) corresponding to the presently measured charging level value X of the battery.

At subsequent step 215, the controller determines whether or not the mobile telephone is in an idle state. If it is determined at step 215 that the mobile telephone is in the idle state, the program proceeds to step 219 where the controller determines whether or not a available service time requesting menu is selected. If it is determined at 219 that the available service time requesting menu is selected, the program proceeds to step 220 where the controller reads the available service time value Y per the unit level from the available service time-per-unit level memory 70. Then, at subsequent step 221, a available service time Z is calculated and displayed on display section 50. After displaying this information, the process returns to step 215 to update the information.

The available service time Z calculated on the basis of a low battery-charging level can be expressed in the following equation:

$$Z = \{X - (A+F)\} * Y \quad (1)$$

where A level indicates a power-down threshold value and F level indicates low battery-charging level.

If on the other hand, it is determined at 215 that the mobile telephone is not in the idle state, the program proceeds to step 216 where the controller determines whether or not the mobile telephone is being used. If it is determined at step 216 that the mobile telephone is being used (the line is busy), the program proceeds to step 217 where the controller determines whether or not the call is completed. If it is determined at step 217 that the call is completed, the program proceeds to step 218 where the available service time value Y per the unit level is updated and stored in the available service time-per-unit level memory 70. The process then returns to step 215.

A factor Y indicative of the available service time per the unit level is stored as a default value in a non-volatile memory when the mobile telephones are into the market, but calculated again and stored as a updated value on the basis of the current calling time any time the users attempt to speak by telephone after the users have begun to use the mobile telephones. Therefore, for example, when users spoke by telephone during a period of time L, and at this moment, a variation in the charging level of the battery is M, the available service time value Y per the unit level can be expressed in the following equation:

$$Y = L/M \quad (2)$$

On the other hand, if it is determined at step 216 that the mobile telephone is not being used, the process routine is concluded.

As can be seen from the foregoing, a device for and a method of displaying available service time in a mobile telephone according to the present invention have an advantage in that since a factor used for calculating a available service time is updated on the basis of experimental values obtained continuously at any time users use mobile telephones, the users can acquire the information reflecting an external change such as a deterioration in a battery performance, thereby enabling the users to predict correctly a battery re-charging time of the mobile telephones based on such information.

While this invention has been described in connection with what is presently considered to be the most practical and preferred embodiment, it is to be understood that the invention is not limited to the disclosed embodiment, but, on the contrary, it is intended to cover various modifications within the spirit and scope of the appended claims.

What is claimed is:

1. A device for displaying available service time in a mobile telephone, comprising:

a battery voltage detecting section adapted to measure a present charging level value of a battery when the mobile telephone is powered on;

an analog/digital converter adapted to convert the measured analog present charging level value into a digital value;

a reference data memory adapted to store a predetermined power-down threshold level value depending on the type of each battery;

an available service time-per-unit level memory adapted to store and update a available service time value per a unit level measured, except an initial default value, any time a user attempts to speak by telephone;

an available service time calculating section adapted to calculate a available service time by using both the power-down threshold level value according to a corresponding battery type and the available service time value per the unit level read out from the available service time-per-unit level memory;

an available service time memory adapted to store the calculated available service time therein; and a display section adapted to display the calculated available service time stored in the available service time memory to inform the user of the present charging state of the battery.

2. The device according to claim 1, wherein the available service time-per-unit level memory is a non-volatile memory.

3. A method of displaying available service time in a mobile telephone, comprising:

(a) determining whether or not a presently measured charging level value X of a battery is greater than a power-down threshold level value when the mobile telephone is powered on;

(b) displaying an icon corresponding to the presently measured charging level value X of the battery, the icon indicative of a plurality of degrees, if it is determined whether or not the presently measured charging level value X of the battery is greater than the power-down threshold level value;

(c) updating a available service time value Y per a unit level and storing it in a available service time-per-unit level memory when the completion of speaking by telephone is sensed if the mobile telephone is being used; and (d) reading the available service time value Y per the unit level from the available service time-per-unit level memory, and then calculating a available service time Z by using the read available service time value Y per the unit level when the selection of a available service time menu is sensed if the mobile telephone is in an idle state after the step (b) has been performed.

4. The method according to claim 3, wherein in the above step (b), the plurality of degrees of the icon include a third degree controlled by a value offset by the power-down threshold value indicating a fully-charged state, a second degree positioned below the third degree, a first degree positioned below the second degree, and a low battery-charging level.

5. The method according to claim 3, wherein the available service time Z is calculated by the following $$Z = \{X - (A + F)\} * Y$$

Where F is a low battery-charging level.

6. The method according to claim 3, wherein the available service time value Y per the unit level is calculated by the following.

Y=L/M where L is a period of time during which users speak by telephone, and M is a variation in the charging level of the battery during the period of time L.

* * * * *